United States Patent [19]

Siegrist

[11] Patent Number: 5,018,696
[45] Date of Patent: May 28, 1991

[54] POWER SEAT ADJUSTER WITH FLOATING DRIVE MECHANISM

[75] Inventor: Ronald R. Siegrist, Grass Lake, Mich.

[73] Assignee: Hoover Universal, Inc., Plymouth, Mich.

[21] Appl. No.: 514,739

[22] Filed: Apr. 26, 1990

[51] Int. Cl.⁵ ............................................ F16M 13/00
[52] U.S. Cl. .................................. 248/429; 74/89.16; 296/65.1; 297/346
[58] Field of Search ............ 248/429, 430, 424; 297/337, 344, 346; 74/89.14, 89.16; 296/65.1, 89.16

[56] References Cited

U.S. PATENT DOCUMENTS

| | | | |
|---|---|---|---|
| 4,275,914 | 6/1981 | Holweg | 296/65.1 |
| 4,516,811 | 5/1985 | Akiyama | 296/65.1 X |
| 4,721,337 | 1/1988 | Tomita | 297/344 |
| 4,796,951 | 1/1989 | Tamura | 297/337 |
| 4,802,374 | 2/1989 | Hamelin | 74/89.14 |
| 4,805,866 | 2/1989 | Aihara | 297/346 |
| 4,838,511 | 6/1989 | Terada | 248/429 |
| 4,863,209 | 9/1989 | Deegener | 296/65.1 |
| 4,909,468 | 3/1990 | Aihara | 248/429 |

*Primary Examiner*—J. Franklin Foss
*Attorney, Agent, or Firm*—Harness, Dickey & Pierce

[57] ABSTRACT

A floating drive mechanism for a power seat adjuster in which carriages are carried by two parallel inserts, each of the inserts including a toothed rack in mesh with a pinion drive gear. The gear and rack are held in a consistent mesh with one another by a spring retainer so that during adjustment of the seat, as the carriage is moving, dimensional variations of the carriages and inserts do not effect the mesh between the gears and racks. The gears include drive shafts which terminate in spherically radiused square drive ends to which are crimped the ends of a torque tube coupling the pinion gears to one another. A transmission/motor assembly pivotally mounted to one of the carriages is used to drive the two gears. The drive shaft couplings with the torque tube enable the two gears to float relative to one another and also relative to the motor/transmission assembly to maintain the consistent mesh between the gears and the racks.

19 Claims, 2 Drawing Sheets

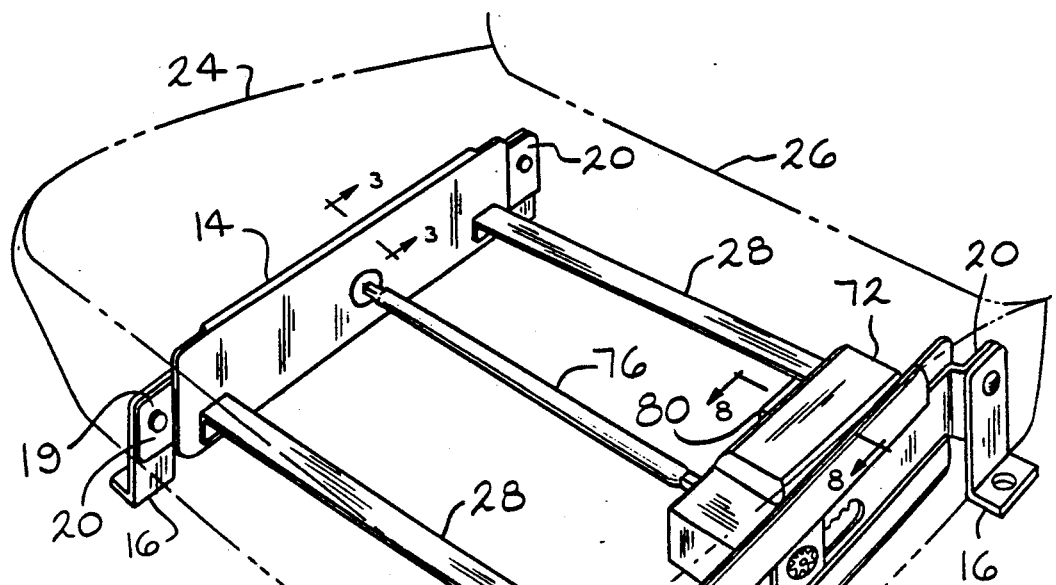
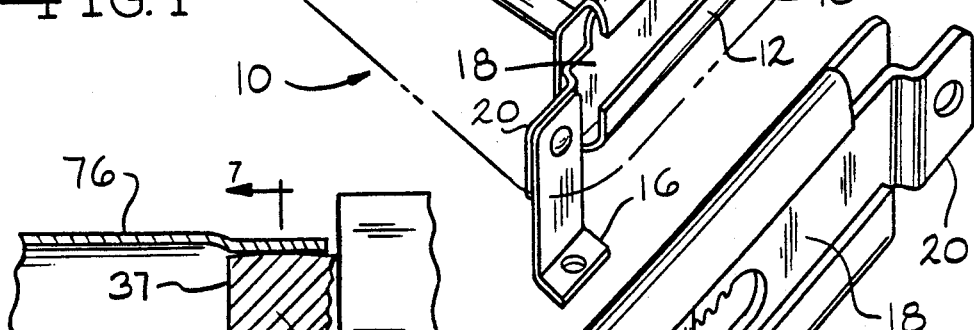
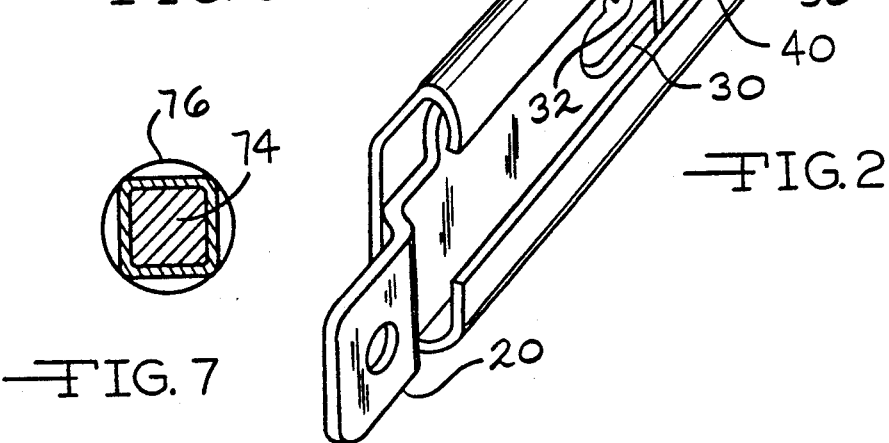

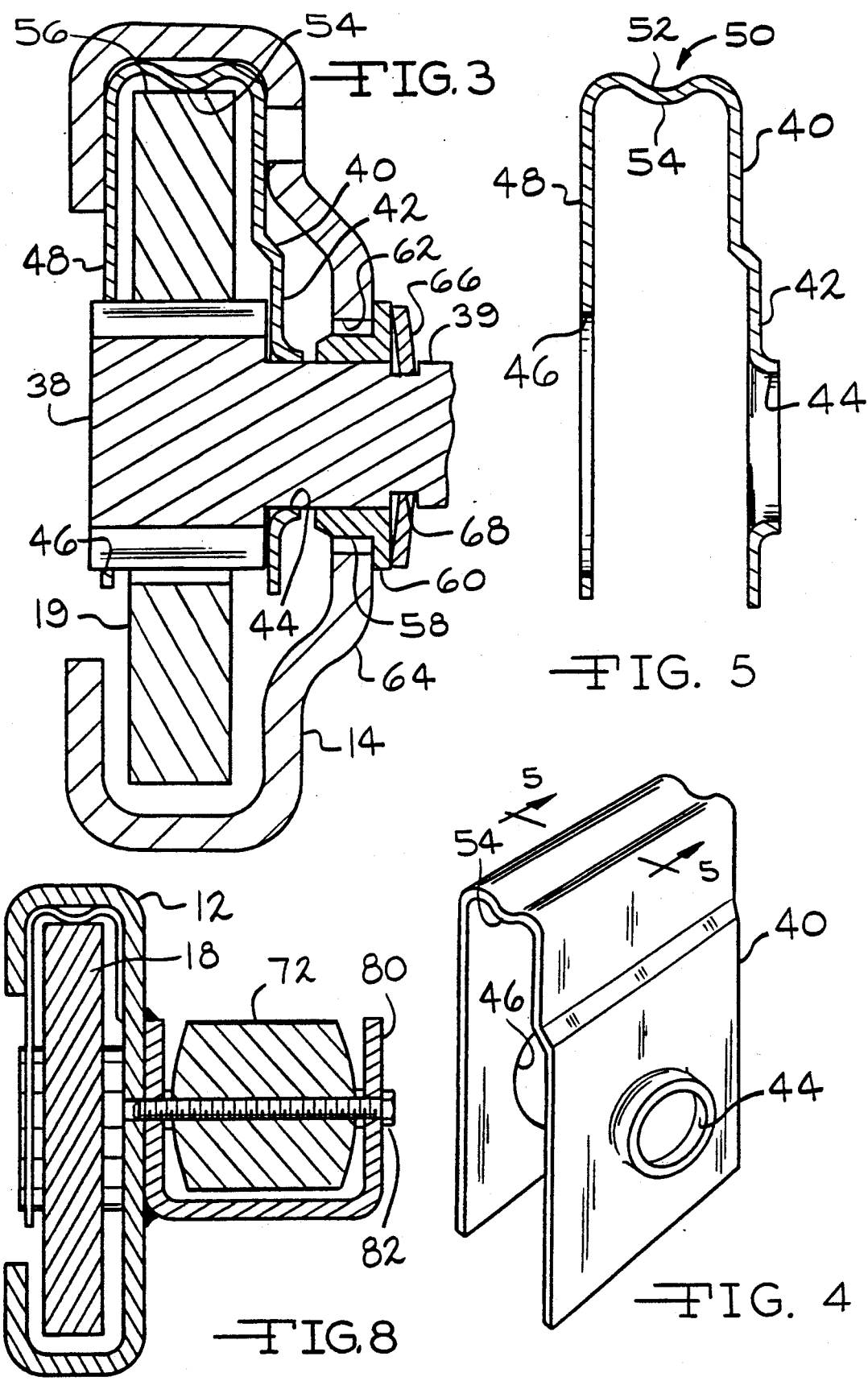

POWER SEAT ADJUSTER WITH FLOATING DRIVE MECHANISM

BACKGROUND AND SUMMARY OF THE INVENTION

The present invention relates to a drive mechanism for an automotive vehicle seat adjuster and in particular to a floating drive mechanism for a power seat adjuster.

In recent years, automobile designs have changed to a sleeker, more aerodynamic, shape in which the roof line of the vehicle has been lowered. As a result of the lowered roof lines, the occupant seats have changed to a more reclined position in order to comfortably fit the occupant within the vehicle. With the more reclined seats, in order to accommodate various size occupants, the seat adjustment travel in the fore and aft direction has been increased from approximately a five inch travel to a nine to eleven inch travel.

Many power seat adjusters utilize a rack and pinion for moving the seat fore and aft. The seat assembly is attached to a carriage that is slidable along a stationary rack mounted to the vehicle floor pan. The carriage is moved fore and aft by a pinion gear driven by a motor and transmission assembly running on a stationary rack. The machining tolerances of the rack and the carriage can result in an uneven meshing of the pinion gear teeth with the rack teeth over the length of travel of the rack. This creates noise and an uneven or jerky motion during the horizontal seat adjustment. With the five inch seat adjustment travel, the noise and uneven motion is normally within acceptable levels. However, when the rack length is increased to provide a greater horizontal travel, the noise level and uneven motion can exceed acceptable levels.

Accordingly, it is an object of the present invention to provide a drive mechanism that maintains a constant mesh between the pinion gear and the rack along the entire length of travel to avoid noise and uneven motion.

The present invention achieves the objective of maintaining a constant mesh between the pinion gear and rack teeth by providing a floating drive mechanism in which the pinion gear is allowed to move vertically relative to the motor and transmission assembly. The pinion gear is retained in a fixed position relative to the rack so that a constant mesh between the pinion gear and rack teeth is maintained. Flexible couplings in the pinion gear's drive shaft as well as a pivotal connection of the motor and transmission assembly to the carriage enables the motor and transmission assembly and the pinion gear to float relative to one another. A typical seat assembly includes a pair of carriages, racks and pinion gears with one of each disposed along opposite lateral sides of the seat.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a seat track with the floating power seat adjuster drive mechanism of this invention;

FIG. 2 is an enlarged perspective view of one side of the drive mechanism shown in FIG. 1;

FIG. 3 is a cross-sectional view of the drive mechanism as seen from substantially the line 3—3 of FIG. 1;

FIG. 4 is a perspective view of the pinion gear spring retainer;

FIG. 5 is a cross-sectional view of the pinion gear spring retainer as seen from substantially the line 5—5 of FIG. 4;

FIG. 6 is a sectional view of the pinion gear drive shaft and torque tube;

FIG. 7 is a sectional view of the pinion gear drive shaft end as seen from substantially the line 7—7 of FIG. 6; and FIG. 8 is a sectional view of the seat frame as seen from substantially the lines 8—8 of FIG. 1.

DETAIL DESCRIPTION OF THE INVENTION

The seat track having a floating seat adjuster drive mechanism according to the present invention as shown in FIG. 1 and designated generally at 10. The seat track includes a pair of carriages 12 and 14 with carriage 12 being disposed along the left hand side of the seat while carriage 14 is disposed along the right hand side of the seat. Fore and aft cross members 28 connect the two carriages together to form a portion of the seat frame structure. The carriages are generally "C" shaped in cross-section and open in the outboard direction. Each carriage includes one of two inserts 18 and 19 and attached to the inserts are a pair of downwardly directed feet 16 which are used to bolt the seat adjuster to the floor pan of a motor vehicle. Other seat frame elements are not shown for purpose of clarity. A seat back 26, only the bottom portion of which is shown in FIG. 1, extends generally upwardly from the seat cushion 24 as is typical for automobile seats.

Inserts 18 and 19 each include a longitudinally extending generally horizontal slot 30. The upper edge of the slots is machined to form gear teeth creating a rack 32. A pinion gear 36 is positioned within the slot 30 with its teeth meshed with the teeth of rack 32 of insert 18. Likewise, a pinion gear 38 is meshed with the rack teeth in the insert 19 in the opposite side of the seat. Rotation of the pinion gears 36 and 38 causes the carriages 12 and 14 to move fore and aft relative to the inserts 18 and 19. The fore and aft motion of the carriages provides the for and aft adjustment of the seat within the motor vehicle.

Pinion gear 36 is integrally formed with a drive shaft 37 extending axially from the gear 36 while the pinion gear 38 is integrally formed with a drive shaft 39 extending axially from the gear 38. Both drive shafts 37 and 39 extend inwardly of the seat.

With reference to FIG. 3-5, a spring retainer 40 is shown that is used to hold the pinion gears in consistent mesh with the teeth of the insert racks. Spring retainer 40 is generally inverted "U" shaped in cross-section with the insert positioned between the legs 42 and 48 of the spring retainer. Leg 42 of the spring retainer includes an aperture 44 that is concentric with the aperture 46 in the opposite parallel leg 48. As shown in FIG. 3, the drive shaft 39 of pinion gear 38 extends through the aperture 44 and is closely fitting in the aperture. Aperture 44 is flared to provide a bearing surface for the pinion gear drive shaft. The pinion gear 36 extends through the opposite aperture 46 which is sized to closely fit the gear.

The closed end 50 of the spring retainer includes a depression 52 in the center thereof that forms a rib 54 extending downward on the inner surface of the spring retainer. The rib 54 extends the length of the spring retainer 40. When the spring retainer and pinion gear are assembled on the insert, the rib 54 contacts the edge surface 56 of the insert opposite the rack 32. The apertures 46 and 44 are positioned relative to the rib 54 such that when assembled, the pinion gear teeth are meshed with the teeth of rack 32. The top edge surface 56 of the insert is machined while running the rack 32 over a pinion gear to provide a constant height between the rack teeth and the top surface 56 along the entire length of the rack. The retainer 40 is made of a spring steel and the rib 54 enables the clip to apply a predetermined minimum force on the pinion gear to hold it in mesh with the rack.

The drive shaft 39 of the pinion gear extends through a journal bearing 58 that includes a radially extending shoulder 60 which contacts the periphery of a vertical slot 62 in the wall 64 of the carriage. A bowed retaining ring 66 is seated in a groove 68 in the drive shaft to prevent the pinion gear from moving outward. Gear 38 is too large to fit through aperture 44, preventing the gear from moving inward.

With reference again to FIG. 1, a motor and transmission assembly 72 is attached to the inner side of the carriage 12. The motor/transmission assembly 72 is used to drive the pinion gears to move the carriages relative to inserts 18 and 19 to adjust the position of the seat. The motor/transmission assembly 72 is mounted at its rearward end to the carriage 12 by a bracket 80. Bracket 80 is attached to carriage 12 by welding, riveting or the like. A single bolt 82 holds the motor/transmission assembly in place and allows pivotal movement of assembly 72 in a vertical direction.

The drive shaft 37 of pinion gear 36 extends through the motor/transmission assembly and is coupled with the transmission for rotation in response to actuation of the motor. The end of drive shaft 37 opposite from the pinion gear 36 is shaped to form a spherically radiused square drive end 74. A hollow torque tube 76 is telescoped over the drive end 74 and is crimped thereto. The spherically radiused square drive end allows the pinion gear drive shaft to pivot relative to the crimped end of torque tube 76. The opposite end of torque tube 76 is similarly connected to a spherically radiused square drive end on the drive shaft 39 of pinion gear 38. As a result, the two pinion gears are allowed to pivot relative to the torque tube and to thus move or float relative to each other.

During adjustment of the seat, if the vertical position of a carriage changes with respect to its insert, the pinion gear, by being held in mesh with the rack by retainer 40, will move vertically with the insert. The pinion gear mesh with the rack teeth is maintained consistently, such that noise and uneven motion are avoided. The pivotal mount of motor and transmission assembly 72 along with the two pivotal drive ends of the pinion gear drive shafts enables the pinion gears to float vertically and relative to each other and the motor/transmission assembly to respond to changing positions of the carriages 12 and 14.

It is to be understood that the invention is not limited to the exact construction or method illustrated and described above, but that various changes and modifications may be made without departing from the spirit and scope of the invention as defined in the following claims.

I claim:

1. An adjustable vehicle seat assembly comprising:
   a stationary track structure having means for mounting said seat assembly in a vehicle;
   a seat frame structure having a driven member carried by said stationary track structure for movement in the direction of adjustment of said seat assembly;
   means mounted to said seat frame structure for driving said frame structure including a drive member rotatably carried by said driven member and engaging said stationary track structure whereby rotation of said drive member causes movement of said driven member and said seat frame structure relative to said track structure in the direction of said seat assembly adjustment;
   means associated with said drive member and said stationary track structure for holding said drive member and track structure engaged with one another and in a fixed vertical position relative to one another.

2. The seat assembly of claim 1 wherein said drive means further includes a motor and means for coupling said motor to said drive member, said coupling means enabling said drive member to pivot about said coupling means.

3. The seat assembly of claim 2 wherein:
   said track structure includes two generally parallel inserts spaced from one another along opposite sides of said seat assembly, said seat frame structure driven member including a pair of carriages, each of said carriages being movably supported on individual inserts for motion of said carriages in the direction of seat assembly adjustment; and
   said drive member including a pair of drive gears, each of said inserts including a rack, the teeth of which engage the teeth of said drive gears whereby said carriages are moved in response to rotation of said drive gears.

4. The seat assembly of claim 3 wherein said motor is mounted to said track structure about a single pivot enabling said motor to rotate about said pivot in a generally vertical plane.

5. A vehicle seat having a drive mechanism for adjusting the position of said seat in one direction, comprising:
   a stationary insert with a toothed rack and means for securing said insert in a vehicle;
   a carriage carried by said insert for motion in the direction of adjustment, said carriage having means for attaching a seat cushion frame thereto;
   a drive gear rotatably carried by said carriage and engaging the teeth of said rack for moving said carriage in response to rotation of said drive gear;
   means operatively associated with said rack and said drive gear for holding the teeth of said drive gear in engagement with said rack teeth and for holding said gear in a fixed position relative to the teeth of said rack;
   drive means supported by said carriage and coupled with said drive gear for rotating said drive gear; and
   means for coupling said drive gear to said drive means, said coupling means enabling said drive gear to move relative to said drive means as said drive gear teeth maintain engagement with said rack teeth during rotation of said drive gear.

6. The seat of claim 5 wherein said adjustment is in the fore and aft direction.

7. A vehicle seat having a drive mechanism adjusting the position of said seat in one direction comprising:
- a pair of generally parallel elongated inserts each including a toothed rack, said inserts being spaced from one another along opposite sides of said seat, said inserts being adapted to be attached to a vehicle;
- a pair of carriages movably supported by said inserts with one carriage supported by one of said inserts and the other carriage supported by the other of said inserts, said carriages being moveable relative to said inserts in the direction of adjustment of said seat;
- a pair of drive gears, one of said gears meshing with one of said racks and the other of said gears meshing with the other of said racks, said drive gears being supported by said carriages for movement of said carriages in response to rotation of said drive gears;
- means for holding the teeth of said drive gears in mesh with the teeth of the respective racks;
- drive means supported by at least one of said carriages for rotating said gears to move said carriages; and
- means for coupling said drive means to said drive gears, said coupling means enabling said drive gears to move relative to said drive means as said gears maintain mesh with said racks during rotation of said drive gears.

8. The seat of claim 7 wherein said inserts are disposed on opposite lateral sides of said seat and extend in the fore and aft direction, said carriages being moveable in the fore and aft direction whereby said seat is adjustable in fore and aft direction.

9. The seat of claim 8 wherein said drive means includes a motor and transmission assembly drivingly coupled to said drive gears by said coupling means.

10. The seat of claim 9 wherein said motor and transmission assembly is mounted to one of said carriages about single generally horizontal pivot enabling said assembly to rotate about said pivot in a generally vertical direction.

11. The seat of claim 8 wherein each of said drive gears has a drive shaft coupled thereto for rotating said gears, the ends of said drive shafts opposite said gears being coupled to opposite ends of a torque transmitting member whereby said drive gears are coupled to one another, the coupling of said drive shaft ends to said torque transmitting member including means for pivoting said drive shafts relative to said torque transmitting member whereby said drive gears are allowed to move relative to one another.

12. The seat of claim 11 wherein said drive means includes a motor and transmission assembly drivingly coupled to said drive gears by said coupling means for simultaneously rotating both of said gears.

13. The seat of claim 11 wherein said means for pivoting said drive shafts includes a spherically radiused square drive end on said drive shafts opposite said gears and said torque transmitting member is a hollow tube, the ends of which are telescoped over said drive shaft ends and crimped thereto.

14. The seat of claim 7 wherein said means for holding said drive gears in consistent mesh with said racks includes a pair of spring clips, one clip associated with one of said gears and the other clip associated with the other of said gears, said clips supporting said gears at a fixed distance from an exterior edge surface of said racks opposite from said rack teeth.

15. The seat of claim 14 wherein said clips are generally U-shaped, each clip having two generally parallel legs and said racks are disposed between said legs with the edge surface of said racks contacting the closed ends of said clips, said clip legs each including an aperture for supporting said pinion gears at a fixed distance from said edge surfaces.

16. The seat of claim 15 wherein the closed ends of the clips are shaped to form a central rib projecting inwardly of said clips and engaging the rack edge surfaces, said clips being made of a spring steel to enable said clips to maintain a predetermined engagement force between said drive gears and said racks.

17. The seat of claim 11 wherein said means for holding said drive gears in consistent engagement with said racks includes a separate spring clip supporting each gear and its associated drive shaft on opposite sides of each of said racks at a fixed distance from an exterior edge surface of said racks opposite from said rack teeth whereby if one of said racks moves vertically relative to its carriage, the associated drive gear moves with the rack to maintain consistent mesh with the rack teeth.

18. The seat of claim 17 wherein said clips are generally U-shape and said racks are disposed between the legs of said clips with the edge surface of said racks contacting the closed end of said clips, said clip legs including apertures through which the drive gear and drive shaft are disposed for supporting said gear at a fixed distance from said edge surface.

19. The seat of claim 18 wherein said clip closed end is shaped to form a central rib projecting inwardly of said clip to engage said rack edge and said clip is made of a spring steel to enable said clip to maintain a predetermined minimum engagement force between said drive gear and said rack.

* * * * *